(12) United States Patent
Legrand

(10) Patent No.: US 10,631,457 B2
(45) Date of Patent: Apr. 28, 2020

(54) CUTTING HEAD FOR VEGETATION CUTTING MACHINE

(71) Applicant: SPEED FRANCE SAS, Arnas (FR)

(72) Inventor: Emmanuel Legrand, Villeneuve (FR)

(73) Assignee: SPEED FRANCE SAS, Arnas (FR)

( * ) Notice: Subject to any disclaimer, the term of this patent is extended or adjusted under 35 U.S.C. 154(b) by 0 days.

(21) Appl. No.: 14/419,236

(22) PCT Filed: Aug. 5, 2013

(86) PCT No.: PCT/EP2013/066346
§ 371 (c)(1),
(2) Date: Feb. 2, 2015

(87) PCT Pub. No.: WO2014/020178
PCT Pub. Date: Feb. 6, 2014

(65) Prior Publication Data
US 2015/0230401 A1    Aug. 20, 2015

Related U.S. Application Data

(60) Provisional application No. 61/786,129, filed on Mar. 14, 2013, provisional application No. 61/679,576, filed on Aug. 3, 2012.

(30) Foreign Application Priority Data

Sep. 20, 2012 (FR) .................................. 12 58811
Mar. 14, 2013 (FR) .................................. 13 52263

(51) Int. Cl.
*A01D 34/416* (2006.01)

(52) U.S. Cl.
CPC ..... *A01D 34/4161* (2013.01); *A01D 34/4168* (2013.01)

(58) Field of Classification Search
CPC .............. A01D 34/416; A01D 34/4161; A01D 34/4163; A01D 34/4166; A01D 34/84;
(Continued)

(56) References Cited

U.S. PATENT DOCUMENTS 3,612,424 A * 10/1971 Friedel ................. G03B 27/588
242/348.4
4,024,635 A    5/1977 Mizuno et al.
(Continued)

FOREIGN PATENT DOCUMENTS

CN         101982036         3/2011
DE    102007007987 A1 *  8/2008  ......... A01D 34/4168
(Continued)

OTHER PUBLICATIONS

English Translation of EP0435795.*
(Continued)

*Primary Examiner* — Jennifer B Swinney
(74) *Attorney, Agent, or Firm* — Pearne & Gordon LLP

(57) ABSTRACT

The invention relates to a cutting head (1) for a vegetation cutting machine, such as a border trimmer or a brush cutter, to accommodate a coil (2) having a plurality of temporarily bonded turns (21) of at least one cutting filament (20) and exhibiting a central void (22). The cutting head including:
a body (10) defining an inner recess (11) for the coil (2) and provided with a peripheral opening (12) for the emergence of a cutting filament separated from the coil, and capable of being driven in rotation by a motor,
a central mandrel (13) adapted to support the at least one coil, the mandrel comprising at least one arrangement adapted to cooperate with the coil so as to provide for rotational engagement between the mandrel (13) and the coil (2). The mandrel (13) being able to selectively rotate relative to the body (10).

26 Claims, 10 Drawing Sheets

(58) Field of Classification Search
CPC .............. A01D 34/535; A01D 34/4168; A01D 34/4162
See application file for complete search history.

(56) References Cited

U.S. PATENT DOCUMENTS

| | | | | |
|---|---|---|---|---|
| 4,050,648 A * | 9/1977 | Tisma | .................... | B65H 49/08 242/129.8 |
| 4,148,141 A * | 4/1979 | Hoff | .................... | A01D 34/416 30/276 |
| 4,161,820 A * | 7/1979 | Moore | ............... | A01D 34/4163 30/276 |
| 4,162,575 A * | 7/1979 | Ballas | ............... | A01D 34/4165 242/118.4 |
| 4,167,812 A * | 9/1979 | Moore | ............... | A01D 34/4163 30/276 |
| 4,185,381 A * | 1/1980 | Palmieri | ............ | A01D 34/4163 30/347 |
| 4,250,623 A * | 2/1981 | Pittinger | .............. | A01D 34/416 30/347 |
| 4,282,653 A * | 8/1981 | Comer | ............... | A01D 34/4168 30/276 |
| 4,411,069 A * | 10/1983 | Close | ................ | A01D 34/4161 30/276 |
| 4,625,501 A * | 12/1986 | Baba | .................... | A01D 34/416 30/276 |
| 5,657,542 A * | 8/1997 | White, III | .......... | A01D 34/4163 30/276 |
| 5,675,897 A | 10/1997 | Berfield | | |
| 2002/0026714 A1 | 3/2002 | Peterson et al. | | |
| 2003/0188437 A1* | 10/2003 | Alliss | .................. | A01D 34/416 30/276 |
| 2004/0134078 A1* | 7/2004 | Pfaltzgraff | ......... | A01D 34/4163 30/276 |
| 2004/0222263 A1* | 11/2004 | Holden | ............. | A47K 10/3836 225/106 |
| 2005/0072007 A1* | 4/2005 | Proulx | ............... | A01D 34/4163 30/276 |
| 2008/0083120 A1* | 4/2008 | Alliss | ................. | A01D 34/4166 30/276 |
| 2010/0229401 A1* | 9/2010 | Kato | .................... | A01D 34/416 30/276 |
| 2011/0239468 A1* | 10/2011 | Conlon | .............. | A01D 34/4163 30/276 |
| 2012/0219761 A1 | 8/2012 | Legrand et al. | | |

FOREIGN PATENT DOCUMENTS

| | | |
|---|---|---|
| EP | 0435795 | 7/1991 |
| FR | 2559343 | 8/1985 |
| FR | 2967548 | 5/2012 |
| JP | 52-006617 A | 1/1977 |
| JP | 55-025447 U | 2/1980 |
| JP | 60-131120 U | 9/1985 |
| JP | 2006-514837 A | 5/2006 |
| JP | 2008-253216 A | 10/2008 |
| WO | 2004/062347 A2 | 7/2004 |
| WO | 2008/053508 A2 | 5/2008 |
| WO | WO-2013179318 | 12/2013 |

OTHER PUBLICATIONS

English Translation of DE102007007987.*
Chinese Office Action with English Language Translation dated Jan. 26, 2016, PCT Application No. 2016012101425970.
PCT Search Report dated Oct. 16, 2013 with cover sheet, PCT Appln. No. PCT/EP2013/066346, 12 pages.
French Search Report dated Jun. 5, 2013 with cover sheet, FR Appln. No. 1258811, 8 pages.
International Preliminary Report on Patentability received for PCT Patent Application No. PCT/EP2013/066346, dated Feb. 12, 2015, 17 pages. (10 pages of English Translation and 7 pages of Original Document).

* cited by examiner

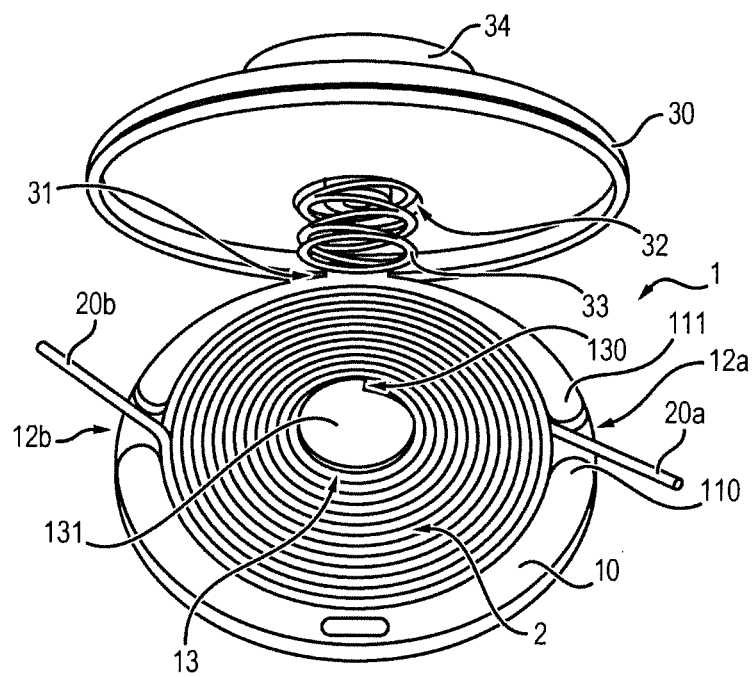
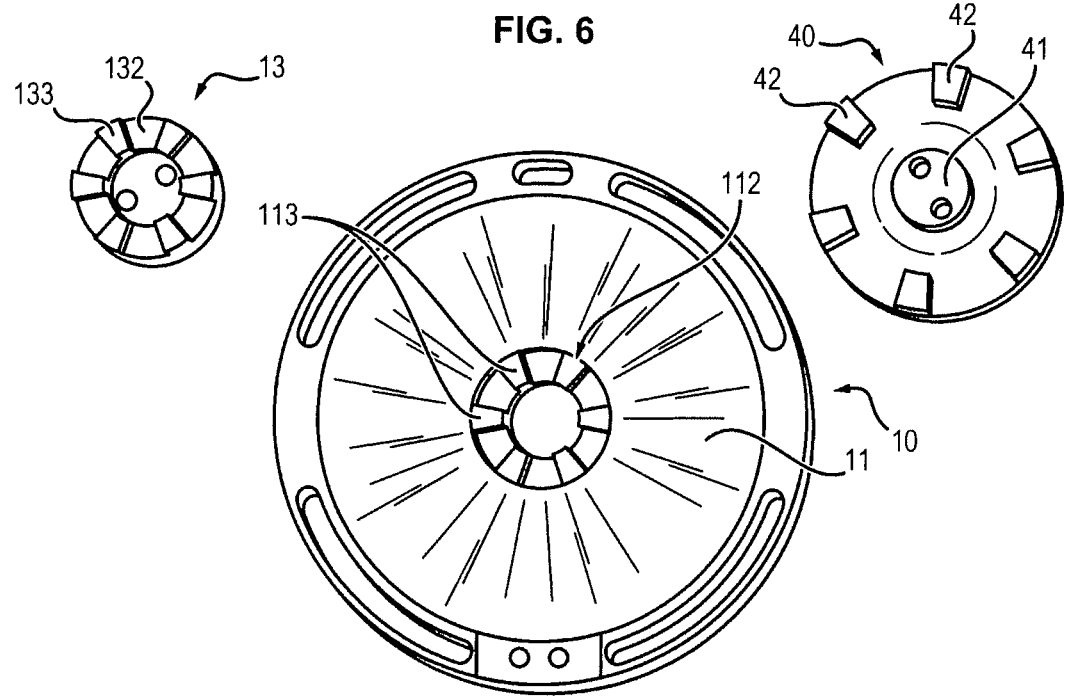

CUTTING HEAD FOR VEGETATION CUTTING MACHINE

FIELD OF THE INVENTION

The present invention relates to a cutting head for a vegetation cutting machine, such as a border trimmer or brush cutter.

BACKGROUND OF THE INVENTION

Filaments for cutting vegetation are generally made by extrusion of a thermoplastic material, including polyamide in particular, and having a variety of shapes.

While the oldest filaments had a circular cross-section and were smooth throughout, filaments having a variety of cross-sections have been developed in order to improve cutting quality (presence of edges, etc.) and/or the lifetime of the filament, and/or to reduce the operating noise of the machine by operating on turbulence.

Thus there are filaments comprising ridges, grooves, slots, or even local distortions of the filament along its length.

For the sake of saving space, cutting filaments are generally sold as coils.

However, the stiffness of the materials of which they are constituted implies that they cannot remain coiled and that the coil therefore unwinds if it is not held by some means of retention.

Typically, cutting filament coils are sold in packaging having shape and dimensions matching the shape and dimensions of the coil, so that its shape is maintained by the inner walls of the box.

To use the filament in a cutting machine, it is necessary to reel off a certain length of filament and to wind it around the hub of the cutting head, allowing a portion needed for cutting to emerge from a side opening of the cutting head.

This operation consisting of placing the filament in the cutting head is a tedious operation.

Further, due to its stiffness, the filament has a tendency to unwind even after it is in place in the cutting head, making it difficult to control the length which emerges from the head for performing the cutting.

To correct these drawbacks, coils that are self-supporting, that is to say consisting of turns bonded to one another but separable by a pulling force exerted on the free end of the filament, have been proposed.

Thus, document U.S. Pat. No. 4,024,635 proposes a self-supporting coil, the different turns whereof are bonded to one another by welding, by an adhesive or by injection of breakable connections between two adjoining turns.

Document FR 2 967 548 proposes, for its part, a filament having reciprocal retention provisions such that, when the filament is wound upon itself, each turn cooperates with at least one adjoining turn so as to retain it mechanically.

This filament therefore makes it possible in particular to make a self-supporting coil in the form of a disk for example.

To use the self-supporting coil directly in a cutting machine, that is without having to reel off the coil and then wind the filament onto the hub of the cutting head as is necessary with conventional coils, document U.S. Pat. No. 4,024,635 cited earlier proposes a cutting head wherein the self-supporting coil is captured between an upper portion designed to be attached to the device driving the machine in rotation and a lower portion removably fixed to the upper part by a central nut.

The coil is centered relative to the head by its central void, which is accommodated by a revolving cylindrical stud built into the upper portion of the cutting head, and gripped between the upper and lower portions of the head in such a position that the free end of the filament extends through an opening provided in said upper portion for a length predetermined for performing the cutting.

When the filament is worn out, the used portion is cut off and a new portion of filament is paid out.

To this end, it is necessary to loosen the central nut to spread slightly the upper portion and the lower portion of the cutting head, then a pull is exerted on the filament to reel off a portion of it.

The central nut is then re-tightened to ensure that the coil is held between the upper portion and the lower portion of the cutting head.

Though having a simple design, this cutting head has the disadvantage of requiring partial loosening of the lower and upper portions of the cutting head each time a new length of filament must be made available.

Further, this head only allows manual payout of the filament, which requires completely stopping the machine.

A certain number of cutting heads on the market, however, are provided with a "tap and go" system which makes it possible, after a simple tap against the ground by the lower portion of the cutting head, to automatically reel off a predetermined length of filament, while the machine is operating.

Due to its design which captures the coil between the lower and upper portions, the cutting head described above is not compatible with such a system.

One goal of the invention is therefore to design a cutting head which allows a self-supporting coil to be used directly, that is without involving cutting filament reeling off and rewinding operations, and wherein the extraction of a length of filament is simplified.

Preferably, the design of said cutting head should be compatible with the automatic "tap and go" payout system mentioned above.

Another goal of the invention is to propose a cutting assembly having a cutting head and a self-supporting coil specifically matched to one another.

BRIEF DESCRIPTION OF THE INVENTION

In accordance with the invention, a cutting head for a vegetation cutting machine such as a border trimmer or a brush cutter is proposed, designed to accommodate at least one coil consisting of a plurality of temporarily bonded turns of at least one cutting filament and exhibiting a central void, said cutting head including:
  a body defining an inner recess for the coil and provided with a peripheral opening for extending a length of cutting filament separated from the coil, and capable of being driven in rotation by a motor,
  a central mandrel adapted to support said at least one coil, said mandrel comprising at least one arrangement adapted to cooperate with the coil so as to ensure rotational engagement between the mandrel and the coil, the mandrel being able to turn selectively relative to the body.

The coil is flattened in the sense that the set of turns constituting the coil extends in the plane generally transverse to the axis of rotation of the head, or even for example along a flattened cone coaxial with said axis of rotation.

The coil can moreover consist of a single filament wound over itself to form the bonded turns, or of at least two filaments longitudinally bonded in separable fashion so as to form a ribbon, as described for example in document EP 0 435 795, the ribbon then being wound to form the bonded turns.

The coil is annular in the sense that the turns do not extend, toward the interior of the coil, all the way to its center, but maintain a central void substantially matching the outer shape of the mandrel.

According to an embodiment, said arrangement of the mandrel comprises a housing for retaining an inner free end of the coil.

Said housing may extend according to a diameter of the mandrel.

Preferably, said housing is opened at both ends.

According to another embodiment, the peripheral surface of the mandrel is serrated, so as to provide a frictional engagement of the serrations with the coil.

Alternatively, the peripheral surface of the mandrel is provided with a plurality of tapered ribs so as to provide a frictional engagement of the ribs with the coil.

In a particularly advantageous manner, the cutting head further comprises a supporting plate extending radially from the mandrel and a pressuring plate opposite to the supporting plate and adapted to exert a pressure onto the at least one coil when said coil in working position on the mandrel.

According to another embodiment, said arrangement of the mandrel comprises a non-circular shape that matches the shape of the inner void of the coil.

Preferably, the mandrel exhibits in the circumferential direction a shoulder capable of abutting a free inner end of the coil.

The section of the mandrel in a plane perpendicular to its axis of rotation has a spiral contour shape, the radial segment connecting the two outer turns of said spiral corresponding to the abutment surface for the inner end of the filament.

According to one embodiment, the recess is designed to accommodate a coil consisting of a plurality of temporarily bonded turns of at least two cutting filaments longitudinally bonded in a separable manner, and the body has as many openings as filaments.

According to one embodiment, the recess is designed to accommodate at least two coils stacked on the central mandrel and the head includes as many exit openings as there are filaments contained in all the coils.

Preferably, the exit openings of the filaments are regularly spaced circumferentially.

Furthermore, the head advantageously includes a device for driving the mandrel.

According to one embodiment, the device for driving the mandrel includes a manual drive member.

According to another ("tap and go") embodiment, the mandrel drive device includes a bumper attached to the mandrel, positioned on the outside of the body and resisting the return force of an elastic element, said bumper being able to slide along the axis of rotation of the mandrel between a position wherein the mandrel is locked with respect to the body and a position wherein the mandrel is movable in rotation with respect to the body.

Optionally, the head has a device for locking the filament at the exit opening.

Said locking device advantageously includes a stud that can be pivoted between a position releasing the filament when the cutting head is stopped and a position locking the filament under the influence of centrifugal force when the cutting head is driven in rotation by the motor.

Finally, preferably, the head also includes a cover hinged to the body to close the recess for the coil.

Another object relates to a cutting assembly for a vegetation cutting machine, such as a border trimmer or a brush cutter, said assembly including a cutting head such as described above and at least one coil consisting of a plurality of temporarily bonded turns of at least one cutting filament and having a central void.

According to one embodiment, said coil consists of a plurality of temporarily bonded turns of at least two cutting filaments bonded longitudinally in a separable manner.

According to one embodiment, the turns of the coil are temporarily connected by reciprocal retaining means formed on the filament, such that each turn mechanically retains an adjoining turn.

Alternatively or as a supplement, the turns of the coil are temporarily bonded by adhesion, for example by an applied adhesive.

Alternatively or as a supplement, the turns are temporarily bonded by controlled partial fusion of the material of the filament.

According to one embodiment, the cutting assembly includes at least two coils stacked on the mandrel.

In that case, the coils are stacked so as to have the same winding direction.

BRIEF DESCRIPTION OF THE DRAWINGS

Other characteristics and advantages of the invention will appear from the detailed description that will follow, with reference to the appended drawings wherein:

FIG. 5 is an interior view of a cutting head assembled according to one embodiment, FIG. 6 is an exploded view of the body of the cutting head including the "tap and go" device.

DETAILED DESCRIPTION OF EMBODIMENTS OF THE INVENTION

Figure 1:
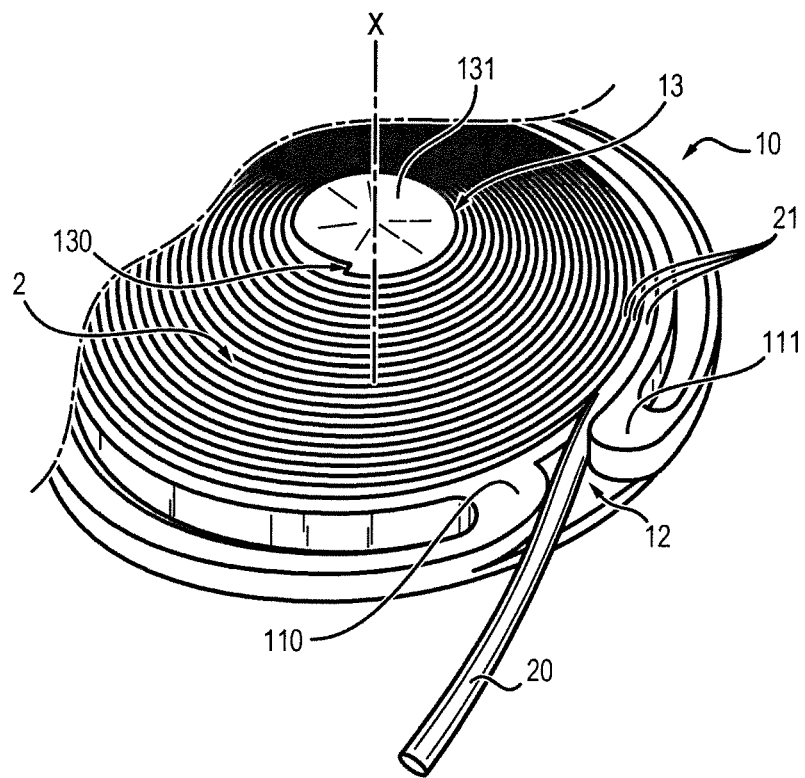
FIG. 1 is a perspective view of a portion of the body of a cutting head according to one embodiment of the invention, wherein is accommodated a coil.

FIG. 1 illustrates a portion of the body 10 of the cutting head according to a first embodiment of the invention, within which a coil 2 is placed.

Said coil 2 consists of a plurality of temporarily bonded turns 21 of at least one cutting filament 20 and exhibiting a central void.

In the embodiment illustrated in this figure, the filament exhibits a circular cross-section but it is understood that, as stated above, the filament can exhibit other cross-sections.

Figure 2:
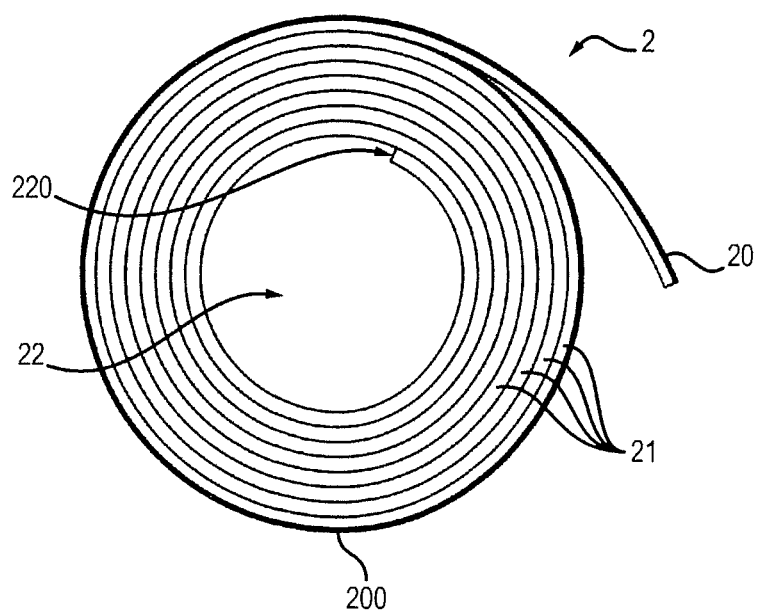
FIG. 2 is a top view of one embodiment of a coil usable in said cutting head.
Figure 3:
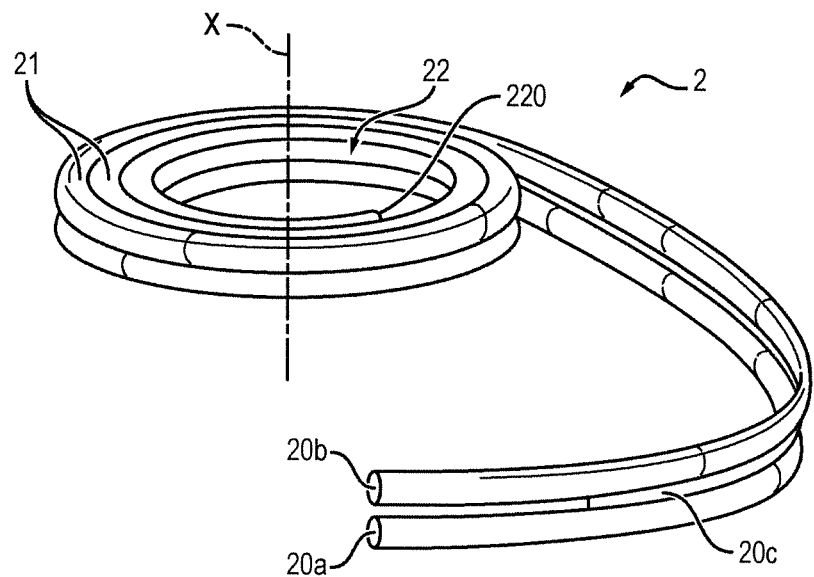
FIG. 3 is a perspective view of one embodiment of a coil usable in said cutting head.

Different embodiments of such a coil are shown in FIGS. 2 and 3.

FIG. 2 illustrates a coil consisting of a single filament 20, which is wound so as to form bonded turns 21.

A first end 220 of the filament is located within the inner void of the coil, while the second end is a free end designed to emerge from the cutting head.

The turns typically extend within one and the same plane.

In this embodiment, the temporary connection of the different turns is accomplished by reciprocal retention provisions formed on the filament, such that each turn mechanically retains one adjoining turn.

These reciprocal retention provisions are described in document FR 2 967 548, which may be referred to.

Naturally, such a coil can also be made by temporarily joining the filaments by other means than mechanical retention provisions.

Thus, the turns can be temporarily bonded together by adhesion (for example by means of a chemical or thermal adhesive deposited continuously or discontinuously) between the turns, by localized partial fusion of the material of the filament between two adjoining turns; by ultrasonic or friction welding.

Any other temporary connection means, that is allowing the turns to be held then separated without damaging the filament, can be used without thereby departing from the scope of the present invention.

FIG. 3 illustrates a coil consisting of two filaments 20a, 20b temporarily bonded in a separable manner, said filaments together constituting a sort of ribbon which is wound upon itself to form temporarily bonded turns 21.

The connection between the two filaments 20a, 20b, for example, is obtained by extrusion of a film 20c of the same material as the filaments during manufacture of said ribbon.

Reference can be made in this connection to document EP 0 435 795.

Said film 20c is thin enough to be torn for the purpose of separating the filaments 20a, 20b over a certain length.

Further, the turns 21 are temporarily bonded by one of the means described above with reference to FIG. 2.

In other words, the coil has two temporary connections: one between the two filaments 20a, 20b over their length; the other between adjoining turns.

Figure 4:
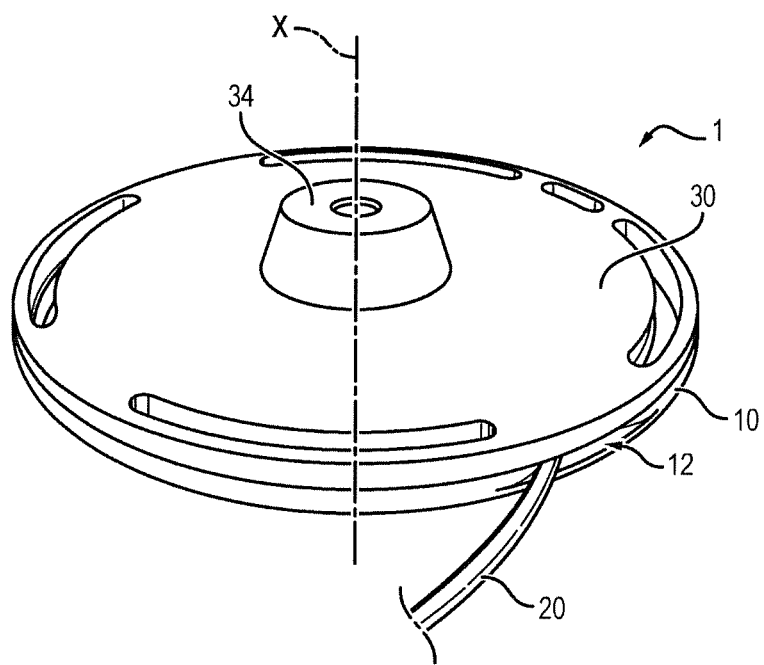
FIG. 4 is an overview of one embodiment of the cutting head.

FIG. 4 is an overview of the cutting head, whereon is seen a cover 30 assembled onto the body 10.

The cover 30 exhibits a boss 34 by which it can be attached to a cutting machine and driven in rotation by the motor of said machine.

Cutting machines and the means of attaching a cutting head to such machines are known per se and will not be described in detail here.

Advantageously, the cutting head is able to be mounted on machines from different manufacturers.

Figure 11:
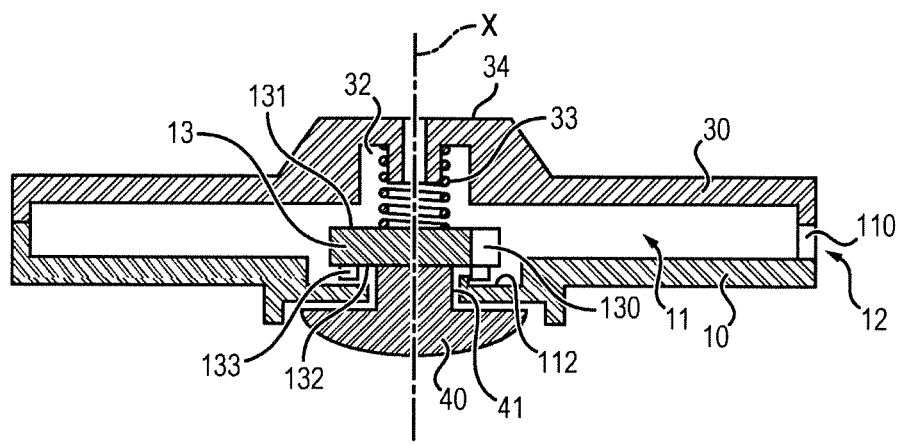
FIG. 11 is a section view of one embodiment of the cutting head.

FIG. 5 illustrates an overview of an open cutting head according to the first embodiment of the invention; FIG. 11 is a section view of said cutting head, empty, in the closed position.

The coil 2 is set in a recess 11 having a shape and dimension substantially identical to those of the coil 2.

Said recess exhibits generally the shape of a cylindrical cavity set within the body 10.

The body 10 additionally includes at least one opening 12 which opens into the coil recess in order to allow the emergence of a length of cutting filament 20 separated from the coil.

For example, the inner and outer walls of the recess exhibit, on either side of the opening 12, a rounded end 110, 111 serving as an abutment surface for the filament during rotation of the cutting head, which limits the risk of breakage at the eyelet, that is breakage of the filament at the opening 12.

The coil 2 is accommodated in the recess 11 on a central mandrel 13 exhibiting a shape complementary to that of the central void of the coil.

Moreover, said mandrel 13 is positioned so as to turn selectively relative to the body 10, the axis of rotation of the mandrel being designated with the label X.

What is meant by selectively is that in normal operation of the cutting head, that is when it is driven in rotation by the motor of the cutting machine for the purpose of cutting vegetation, the mandrel 13 is fixed with respect to the body 10, and that it is caused to turn with respect to the body 10 only by an action from a user.

Contrary to the mandrels used in conventional cutting heads, which have a circular shape, the mandrel 13 exhibits a non-circular shape.

Thanks to this non-circular shape, the coil can be held to the mandrel during its rotation, by cooperation between the shapes of the coil and of the mandrel.

Particularly advantageously, the mandrel exhibits a shoulder 130 in the circumferential direction.

Said shoulder 130 forms an abutment surface for the inner free end of the coil, that is the end 220 of the filament opposite the free end emerging from the head.

The width of the shoulder, in the radial direction, is substantially equal to the width of the filament in the same direction.

Figure 12:
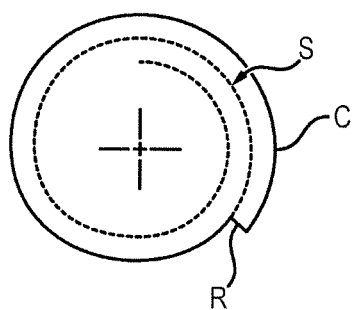
FIG. 12 is a section view of the mandrel according to one embodiment of the invention.

FIG. 12 is a section view of a preferred embodiment of the mandrel 13 in a plane perpendicular to its axis of rotation X.

The cross-section of the mandrel has the shape of the contour C of a spiral S, some inner turns whereof are shown dotted. The radial segment R connecting the two outer turns of said spiral corresponds to the shoulder 130 for the end of the filament situated within the coil, and the length of said segment R is substantially equal to the width of a turn.

The cross-section of the mandrel is thus complementary to that of the central void in the coil.

Moreover, the height of the mandrel 13 (that is, in the X direction) as well as the depth of the recess can be adjusted to accommodate one or more stacked coils.

Particularly advantageously, the cover 30 and the body 10 are connected by a hinge 31, so that opening and closing the cutting head to set in place a new coil are particularly easy and quick.

This does not rule out having the cover and the body assembled by any other means, for example with screws distributed over their periphery.

In the embodiment illustrated in FIG. 5, two filaments 20a, 20b are observed, each of which emerges from an opening 12a, 12b.

The two filaments 20a, 20b can either belong to two stacked coils of the same kind as that illustrated in FIG. 2, or from a coil consisting of two filaments as illustrated in FIG. 3.

The openings 12a, 12b are preferably evenly distributed circumferentially; for example, if the openings are two in number, they are advantageously diametrically opposite.

Naturally, if more filaments are to be used in the cutting head, a sufficient number of openings will be provided.

Moreover, all the openings are not necessarily arranged on the body 10 as illustrated in FIG. 5; the openings can in fact be distributed both on the cover and on the body, for example.

Optionally (not illustrated), the cutting head is provided with a locking device for the filament at the opening.

This device can have a stud pivoting between a position that frees the filament when the head is not moving and a position locking the filament under the influence of centrifugal force when the head is driven in rotation by the motor.

Such a device can prove useful in preventing the turns from sliding along one another under the influence of centrifugal force, in the event that, for example, the turns are not firmly enough bonded together considering the applied force.

Indeed, by locking the filament at the opening, the centrifugal force is prevented from distorting the turns within the head.

Figure 13:
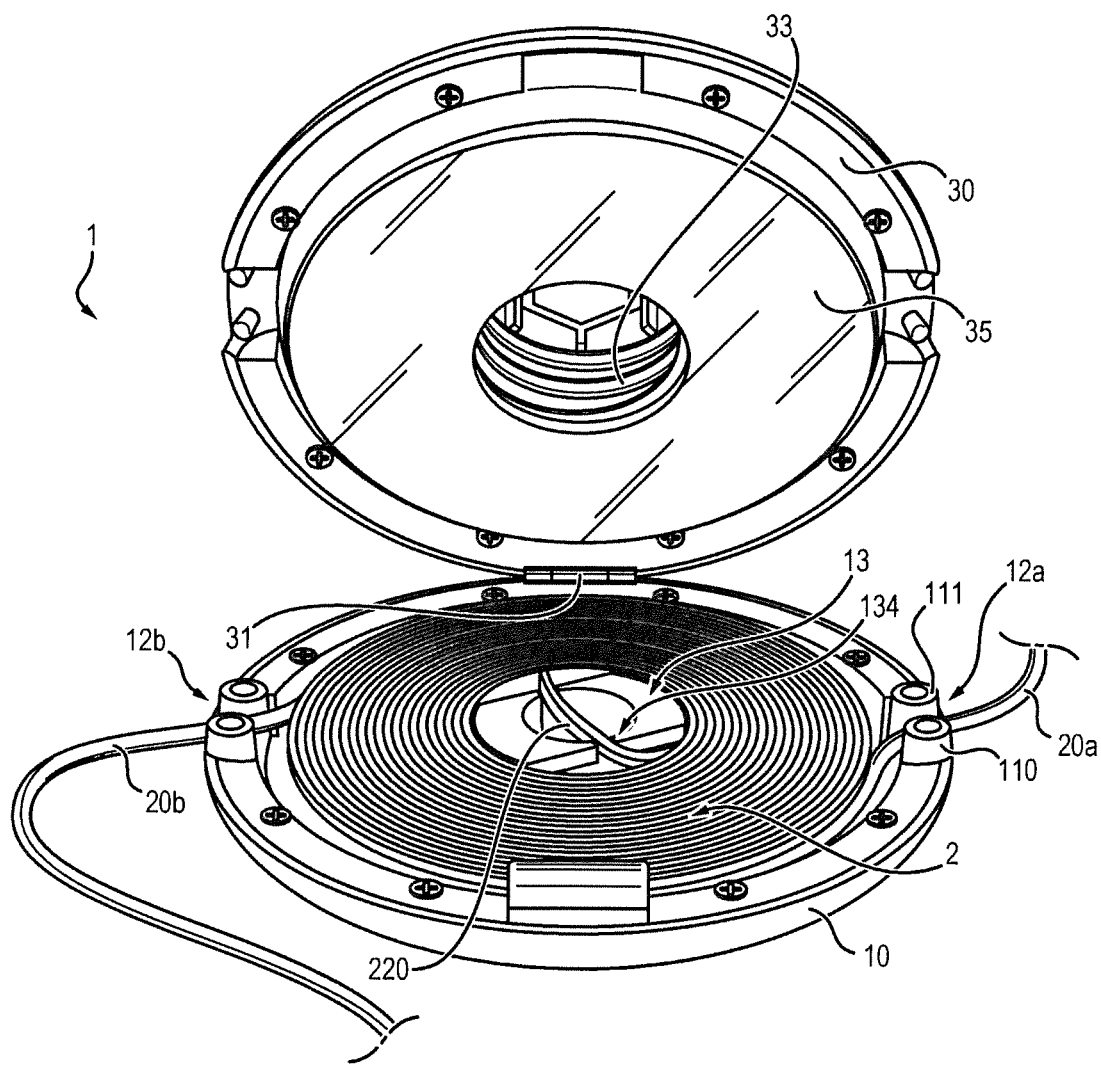
FIG. 13 is an interior overview of a cutting head assembled according to a second embodiment of the invention.

A second embodiment of the invention is illustrated in FIG. 13.

Unless otherwise specified, the parts that have the same reference numerals than in FIGS. 1-12 are similar to the parts described previously and will not be described in detail again.

FIG. 13 shows an interior view of the cutting head 1 wherein one coil 2 has been inserted.

In the example shown here, said coil 2 is of the type illustrated in FIG. 3, i.e. it comprises two filaments 20a, 20b temporarily bonded in a separable manner.

Alternatively, the coil may consist of a single filament and/or several coils may be stacked.

The body 10 comprises two openings 12a, 12b, for filaments 20a and 20b respectively.

In this embodiment, the mandrel 13 does not have a shape matching the inner void of the coil 2.

Instead, the mandrel 13 comprises a housing 134 for holding an inner free end 220 of the coil 2.

Preferably, said housing 134, which has the general shape of a groove extending in a plane perpendicular to the axis of rotation of the mandrel, has a dimension suited to the dimension of the filament such that the filament is forcibly inserted into the housing, thereby exerting a retaining action onto the filament.

This arrangement provides an improved retention of the filament by the mandrel and a better rotational engagement between the mandrel 13 and the coil 2.

The housing 134 may extend along a diameter of the mandrel.

Preferably, the housing 134 is opened at both ends, such that a filament is introduced by one end and goes past the other end, as shown in FIG. 13.

Figure 14:
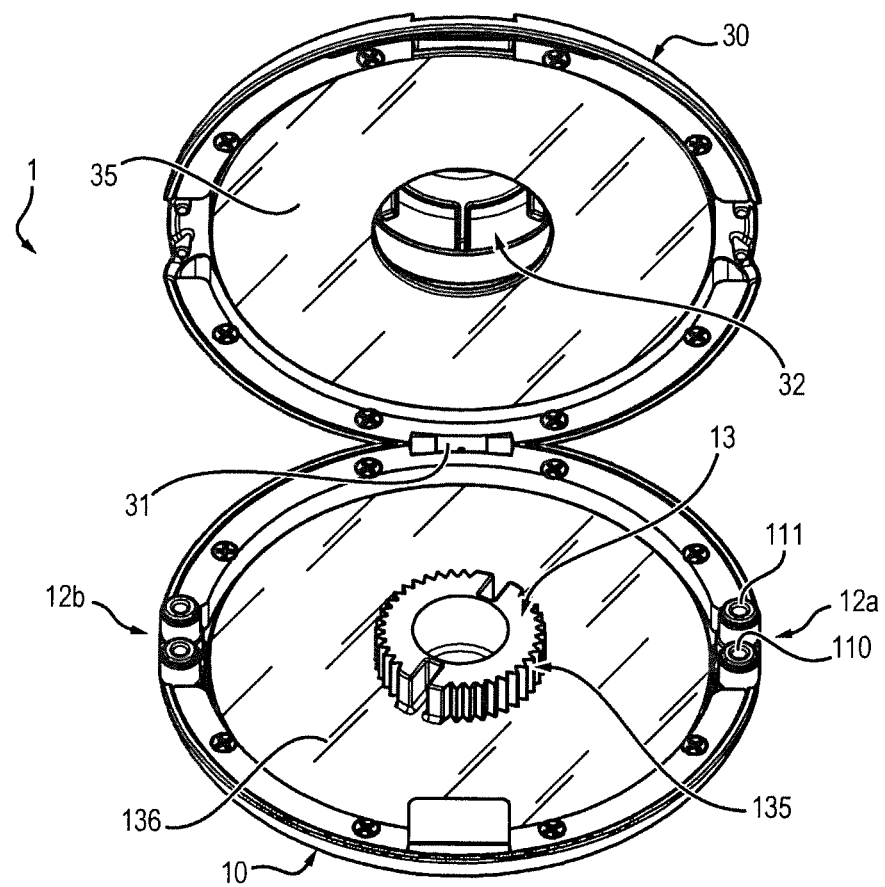
FIG. 14 is an interior overview of a cutting head without the coil according to a third embodiment of the invention.
Figure 15:
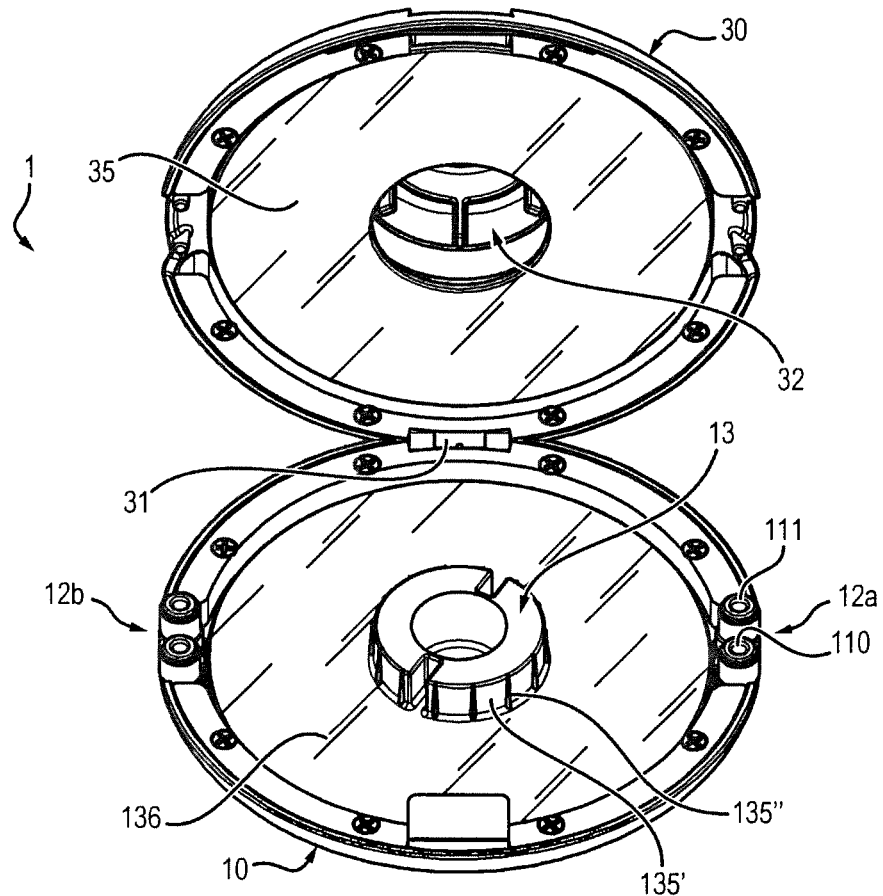
FIG. 15 is an interior overview of a cutting head without the coil according to a fourth embodiment of the invention.
Figure 16:
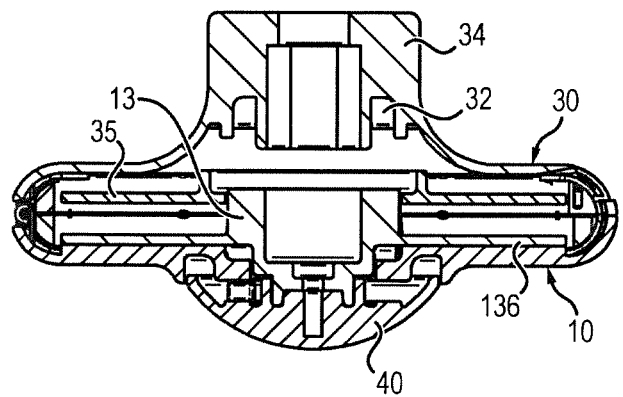
FIG. 16 is a sectional view of a cutting head according to one of the second to fourth embodiments.
Figure 17:
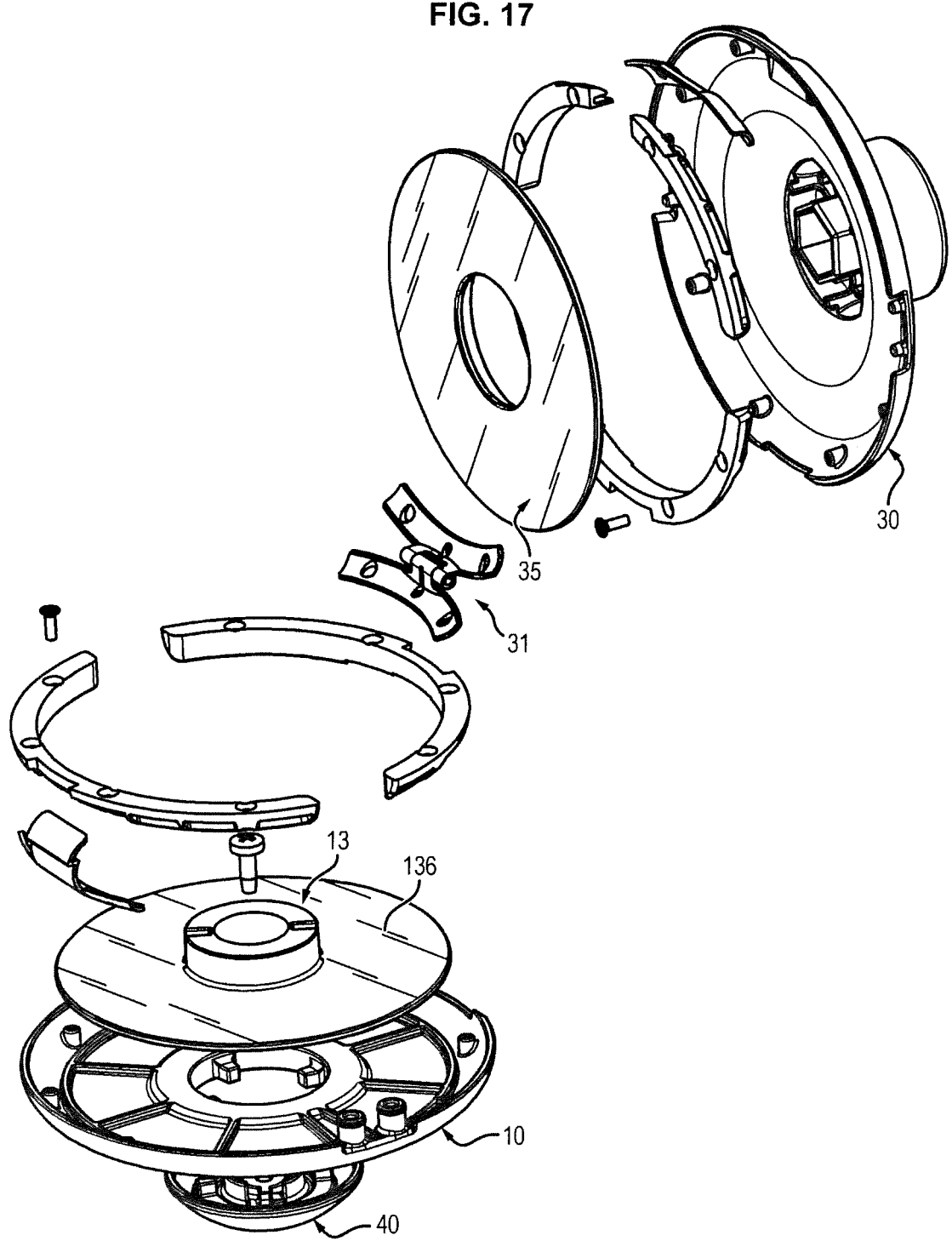
FIG. 17 is an exploded view of a cutting head according to one of the second to fourth embodiments.

FIGS. 14 and 15 present respectively third and fourth embodiments of the invention.

In these embodiments, alternative shapes of the mandrel are provided in order to provide a frictional engagement of the coil onto the mandrel.

As shown on FIG. 14, the mandrel 13 may have a peripheral surface 135 which is serrated.

The serrations extend in a direction parallel to the axis of rotation of the mandrel.

These serrations engage the portion of the filament defining the inner void of the coil and retain the coil onto the mandrel by friction.

As shown in FIG. 15, the mandrel may have a peripheral surface 135' provided with a plurality of radial tapered ribs 135", inscribed within a cone having the same axis as the axis of rotation of the mandrel, which are designed such that the coil is forcibly engaged onto the mandrel by friction onto the ribs.

In this way, the peripheral surface 135 (respectively 135', 135") provides a more intimate contact between the mandrel and the coil as compared to known cylindrical mandrels and thereby allows a rotational engagement of the coil and the mandrel.

In addition, in each of the second to the fourth embodiments, the mandrel 13 comprises a supporting plate 136 that extends radially from the peripheral surface 135 and that supports the coil 2.

In this case, the recess 11 is not only defined by the body 10 itself but also by the supporting plate 136.

Because of the strain generated during use of the cutting head, the mandrel and the supporting plate are advantageously made of metal.

Preferably, the supporting plate is not smooth but instead has a surface having a certain roughness that prevents the coil from sliding.

For example, said surface may consist in an increased roughness of the supporting plate 136, or barbs regularly distributed on the surface.

In an alternative or complementary way, the supporting plate may be pierced with a plurality of circular holes, distributed according to one or several concentric circles around the axis of rotation of the mandrel 13.

Indeed, when the supporting plate 136 is being pierced, the metal that is pushed aside forms around each hole barbs that extend beyond the surface of the plate 136 and that exert a retaining function of the coil.

The supporting plate 136 may thus be pierced with a first series of holes distributed along a first circle close to the mandrel 13, and a second series of holes distributed along a second circle close to the periphery of the plate 136.

According to an advantageous embodiment, shown in FIGS. 13-17, the cutting head further comprises a pressuring plate 35 arranged in the cover 30 against the spring 33 that is described below, opposite to the supporting plate 136.

For instance, the pressuring plate 35 may be attached to the spring 33.

Said pressuring plate 35 is intended to be in contact with the coil and, due to the force of the spring 33, exert a pressure onto the coil when it is in working position within the head.

This allows maintaining the coil in a flat position between the supporting plate 136 and the pressuring plate 35, which in turn promotes a better rotational engagement of the coil and the mandrel and avoids the use of any locking device for the filament at the opening.

Placement of a Coil Inside the Cutting Head

The placement of a coil inside the cutting head is a particularly easy operation because all that is needed is to open the head, set the coil in place in the recess 11 such that the inner free end 220 of the coil abuts the shoulder 130 of the mandrel, thread a length of filament through the opening 12, then close the head.

When a coil consisting of two or more filaments is used, like that illustrated in FIG. 3, the filaments are separated over the desired length and each of the filaments thus separated is threaded through each of the openings provided for this purpose in the cutting head.

When cutting using several filaments is intended, it is also possible to stack several coils each consisting of one filament, the winding direction of said coils being identical, and to thread a length of each filament through each of the openings in the cutting head.

In such case, it is preferable to intercalate a separating plate (not shown) between adjacent coils in order to avoid any friction between the filaments of the coils that may generate a melting thereof.

Said plate may for example be perforated.

In this respect, the use of a coil consisting of two or more filaments is advantageous in that such a separating plate is not necessary.

It is also possible to combine the two foregoing embodiments by stacking for example two coils each consisting of two separable filaments.

In the second, third and fourth embodiments shown in FIGS. 13-17, the placement of a coil inside the cutting head is also very easy.

In the second embodiment (FIG. 13), the user opens the head, sets the coil in place on the supporting plate 136 around the mandrel 13 and inserts the free end 220 of each filament in the housing 134 of the mandrel, threads a length of filament through the opening 12a, 12b, then closes the head.

Paying Out a Length of Filament (Manual Method)

According to one first embodiment, the mandrel 13 is manually operated by the user, while the drive motor of the cutting head is stopped.

To this end, the mandrel is attached, on the outside of the body 10, to a manually operable driving device.

Thus for example, the driving device could have a member such as a nut located on the outside of the body and the rotation whereof drives the rotation of the mandrel and of the coil and thus enables the payout of a length of filament.

Payout of a Length of Filament ("Tap and Go" Method)

According to a second embodiment, the mandrel 13 is operated by a "tap and go" type device which enables automatic payout of the filament by a user's action.

The surface 131 of the mandrel that is oriented toward the cover 30 of the cutting head is called the upper surface, and the opposite surface 132, which is oriented toward the bottom of the recess 11 of the body 10, is called the lower surface.

The mandrel 13 is attached by its lower surface 132 to a bumper 40 which is positioned on the outside of the body, on the surface opposite the bottom of the recess 11.

The bumper 40 typically exhibits the shape of a circular part, having a rounded outer surface, which is designed to be pressed against the ground when the "tap and go" device is employed.

Figure 7:
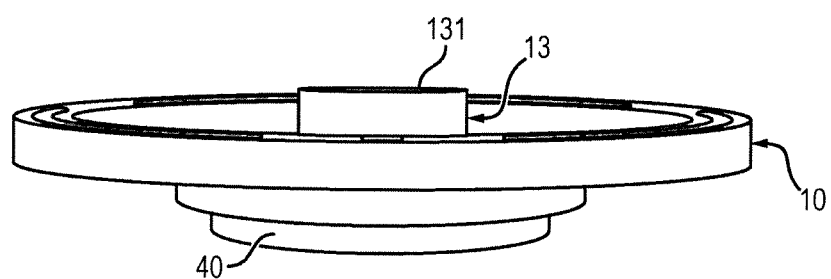
FIG. 7 is a side view of the body of the cutting head including the "tap and go" device.
Figure 8:
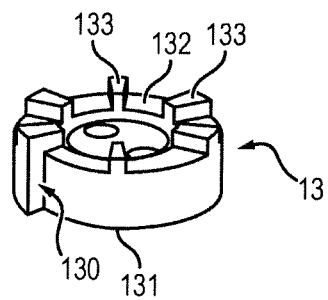
FIG. 8 is a perspective view of the mandrel.

FIG. 6 is an exploded view of these different components.
FIG. 7 is a side view of these components, assembled.

Figure 10:
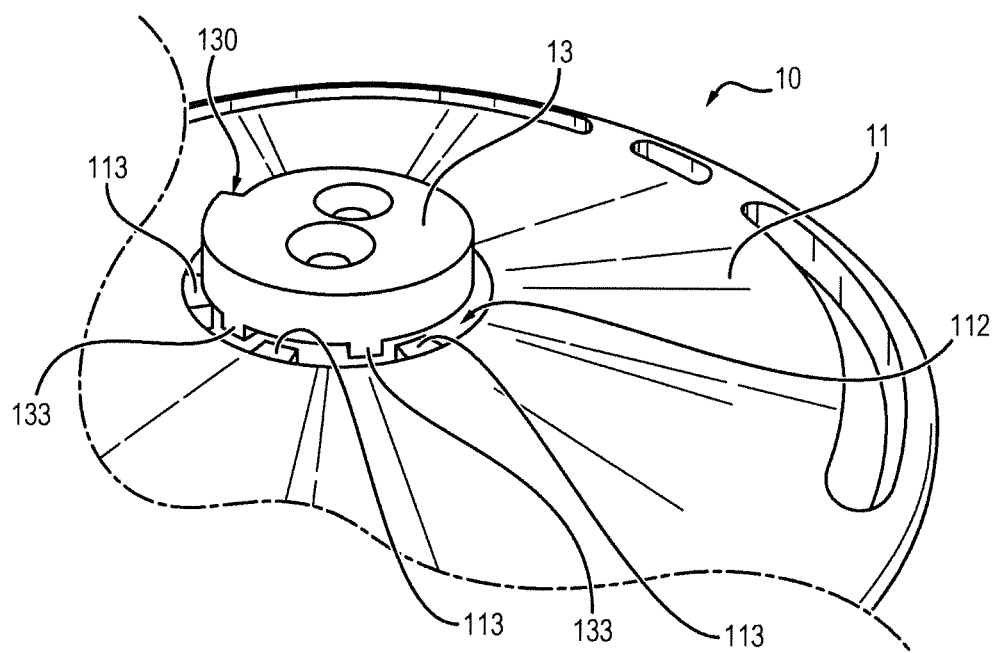
FIG. 10 is a detail view of the mandrel in the position allowing rotation relative to the body.

The bumper 40 has a cylindrical shaft 41 through which it is able to be attached to the lower surface of the mandrel 13, for example by means of screws (cf. FIG. 10).

The dimensions along the axis X of the mandrel 13 and of the bumper 40 are so selected that once assembled on either side of the bottom of the recess 11, the mandrel 13 and the bumper 40 together constitute a rigid element movable by sliding with respect to said recess 11 in the X direction.

Moreover, the mandrel 13 and the recess 11 respectively include teeth 133 (cf. FIG. 8) and a toothed slot 112 (cf. FIG. 6), arranged in two rings which are situated facing one another when the mandrel 13 is positioned within the recess 11.

The cutting head also includes an elastic element, a spring 33 for example, positioned in a central recess 32 of the cover 30 and exhibiting slightly smaller dimensions than those of the mandrel 13 so as to be able to press on its upper surface 131 (cf. FIG. 5).

The distance between the mandrel 13 and the bottom of the recess 32 of the spring, and the length of the spring 33, are selected so that, when the cover and the body of the cutting head are assembled, the spring 33 exerts a force pressing on the mandrel 13 toward the bottom of the recess 11, such that the teeth 133 of the mandrel 13 are accommodated in the toothed slot 112 of the body 10.

In that position, the upper surface of the bumper 40 is remote from the outer surface of the body 10.

Figure 9:
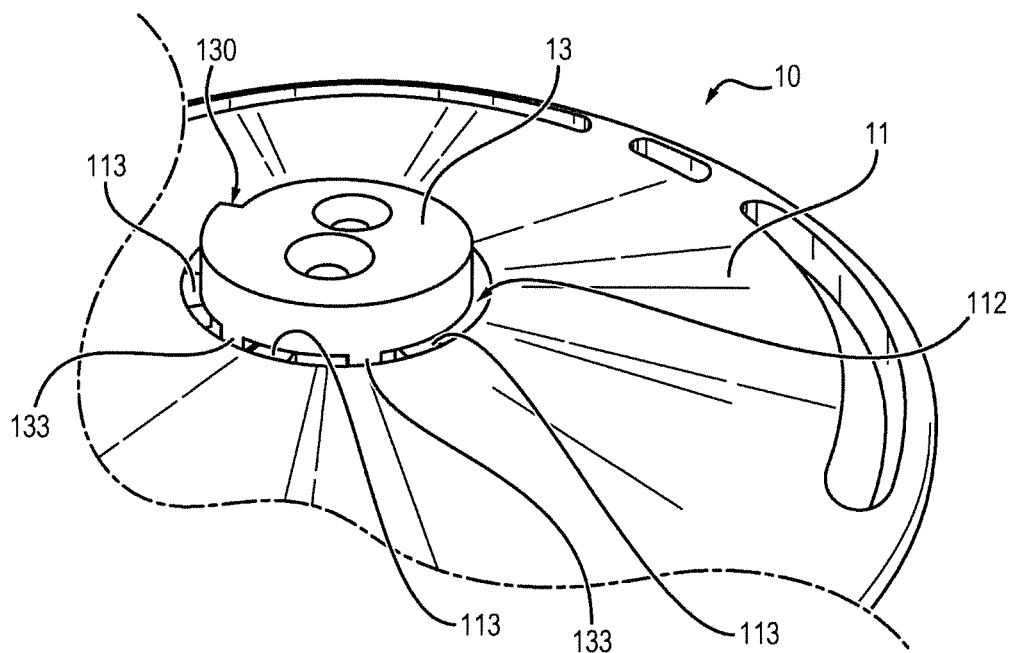
FIG. 9 is a detail view of the mandrel in the position locking it in rotation relative to the body.

In normal cutting head operation, the mandrel 13 is therefore locked in rotation with respect to the body 10 by the teeth 113 provided in said slot 112 (cf. FIG. 9).

To reel off a new length of cutting filament, the user exerts pressure on the bumper 40 of the cutting head, by bumping it against the ground.

This operation is generally implemented when the drive motor of the cutting head is operating at normal speed.

The movement of the bumper 40 toward the body 10 in the X direction brings about the movement of the mandrel 13 to which it is attached in the direction of the cover, against the pressing force exerted by the spring 33.

Thus, the teeth 133 of the mandrel 13 leave the toothed slot 112 of the body and are therefore no longer locked in rotation by the teeth 113 (cf. FIG. 10).

Under the influence of the centrifugal force, the mandrel 13 rotates, driving the coil 2, and a length of filament is paid out automatically through the exit opening 12.

After a certain angular displacement of the assembly consisting of the mandrel 13 and the bumper 40, the teeth 42 of the bumper 40 (cf. FIG. 10) come to abut the teeth (not illustrated) provided in a matching slot of the body 10, which has the effect of stopping the rotation of the mandrel and the paying out of the filament.

The spring 33 then has the effect of pushing back the mandrel 13 into the toothed slot 112 and preventing the rotation of the mandrel 13 relative to the body 10 by abutting the teeth 133 against the teeth 113.

The user bumps the bumper 40 against the ground as many times as necessary for paying out of the head the desired length of filament.

The embodiments shown in FIG. 13-17 also comprise a "tap and go" type device which is similar to the device described above.

However, the cutting head according to these second to fourth embodiments could also be adapted to carry out a manual method as described above.

It goes without saying that these different embodiments are non-limiting examples of the invention.

The invention claimed is:
1. A cutting head for a vegetation cutting machine comprising:
 a body configured to be driven in rotation by a motor and having an inner recess and a peripheral opening;
 said inner recess for receiving a self-supporting coil,
 said self-supporting coil formed by a plurality of annular turns of a cutting filament around a central void, each turn being temporarily bonded to an adjacent turn, said temporary bond being of sufficient strength for said cutting filament to form said self-supporting coil and be maintained as said self-supporting coil outside said inner recess;

said peripheral opening configured to receive an uncoiled end portion of the cutting filament, and a central mandrel for supporting and directly engaging said self-supporting coil, said mandrel having a peripheral surface configured to be rotationally engaged with an inner turn of the self-supporting coil, wherein the peripheral surface of the mandrel comprises serrations that are configured to engage the central void of the self-supporting coil and retain the self-supporting coil onto the mandrel by friction, the mandrel configured to selectively rotate relative to the body such that i) when the mandrel rotates relative to the body the self-supporting coil rotates relative to the body and an end portion of the cutting filament uncoils and exits from the peripheral opening, and (ii) when the mandrel is stationary relative to the body the self-supporting coil is fixed relative to the body.

2. The cutting head of claim 1, wherein the mandrel comprises a housing for holding an inner free end of the coil.

3. The cutting head of claim 2, wherein the housing extends along a diameter of the mandrel.

4. The cutting head of claim 3, wherein the housing is opened at both ends.

5. The cutting head of claim 2, further comprising a supporting plate extending radially from the mandrel and connected to the mandrel, and a pressuring plate opposite to said supporting plate and able to exert a pressure onto the self-supporting coil when said self-supporting coil is received on the mandrel.

6. The cutting head of claim 1, wherein the peripheral surface of the mandrel has a plurality of tapered ribs so as to provide a frictional engagement of the ribs with the self-supporting coil.

7. The cutting head of claim 1, wherein the mandrel is a non-circular shape that matches the central void of the self-supporting coil.

8. The cutting head of claim 7, wherein the mandrel exhibits in a circumferential direction a shoulder capable of abutting an inner free end of the self-supporting coil.

9. The cutting head of claim 7, wherein the cross-section of the mandrel in a plane perpendicular to an axis of rotation has the shape of a contour of a spiral, a radial segment connecting the two outer turns of said spiral corresponding to the shoulder for the inner end of the filament.

10. The cutting head of claim 1, wherein the inner recess accommodates the self-supporting coil having a plurality of temporarily bonded turns of at least two cutting filaments longitudinally bonded in a separable manner and the head has as many peripheral openings as filaments.

11. The cutting head of claim 10, wherein the peripheral openings are equidistantly distributed circumferentially.

12. The cutting head of claim 1, wherein the inner recess accommodates at least two self-supporting coils stacked on the central mandrel and the head has as many peripheral openings as filaments.

13. The cutting head of claim 1, further comprising a device for driving the mandrel.

14. The cutting head of claim 13, wherein the mandrel driving device includes a bumper attached to the mandrel, positioned on an outside part of the body resisting a return force of an elastic element, said bumper being movable by sliding along an axis of rotation of the mandrel between a position wherein the mandrel is locked with respect to the body and a position wherein the mandrel is movable in rotation with respect to the body.

15. The cutting head of claim 1, wherein the head further comprises a cover connected to the body by a hinge to close the inner recess of the body.

16. A cutting assembly for a vegetation cutting machine, said assembly including a body configured to be driven in rotation by a motor and having an inner recess wherein a self-supporting coil is received and provided with a peripheral opening;

said inner recess for receiving the self-supporting coil, said peripheral opening for the emergence of a length of cutting filament separated from the self-supporting coil, said self-supporting coil formed by a plurality of annular turns of said cutting filament around a central void, said central void being defined by an inner turn of the cutting filament, each turn being temporarily bonded to an adjacent turn, said temporary bond being of sufficient strength for said cutting filament to form said self-supporting coil and be maintained as said self-supporting coil outside said inner recess; and a central mandrel for supporting and directly engaging the self-supporting coil, said mandrel having a circumferential surface rotationally engaged with said inner turn of the self-supporting coil, wherein the circumferential surface of the mandrel comprises serrations that are configured to engage the central void of the self-supporting coil and retain the self-supporting coil onto the mandrel by friction, the mandrel configured to rotate relative to the body such that i) when the mandrel rotates relative to the body the self-supporting coil rotates relative to the body and an end portion of the cutting filament uncoils and exits from the peripheral opening, and ii) when the mandrel is stationary relative to the body the self-supporting coil is fixed relative to the body.

17. The cutting assembly of claim 16, wherein the self-supporting coil comprises a plurality of temporarily bonded turns of at least two cutting filaments bonded longitudinally in a separable fashion.

18. The cutting assembly of claim 16, wherein the turns of the self-supporting coil are temporarily bonded by reciprocal retention arrangements formed on the filament, such that each turn mechanically retains one adjacent turn.

19. The cutting assembly of claim 16, wherein the turns of the self-supporting coil are temporarily bonded by adhesion.

20. The cutting assembly of claim 19, wherein the turns are temporarily bonded by an applied adhesive.

21. The cutting assembly of claim 16, wherein the turns are temporarily bonded by controlled partial fusion of the material of the filament.

22. The cutting assembly of claim 16, comprising at least two self-supporting coils stacked on the mandrel.

23. The cutting assembly of claim 16, wherein the inner recess accommodates at least two self-supporting coils stacked on the central mandrel and the head has as many peripheral openings as filaments.

24. The cutting assembly of claim 23, wherein the peripheral openings are equidistantly distributed circumferentially.

25. A cutting assembly for a vegetation cutting machine, said assembly including:

a body configured to be driven in rotation by a motor and having an inner recess;

a self-supporting coil having at least two cutting filaments longitudinally bonded in a separable manner, said self-supporting coil being received in the inner recess;

the body being provided with as many peripheral openings as filaments, said peripheral openings being configured to receive an uncoiled end portion of a cutting filament, said self-supporting coil formed by a plurality of annular turns of each filament, each turn being temporarily bonded to an adjacent turn, an inner turn of each filament defining a central void, said temporary bond being of sufficient strength for said cutting filament to form said self-supporting coil and be maintained as said self-supporting coil outside said inner recess; and a central mandrel for supporting and directly engaging the self-supporting coil, said mandrel having a circumferential surface rotationally engaged with said inner turn of the self-supporting coil, wherein the circumferential surface of the mandrel comprises serrations that are configured to engage the central void of the self-supporting coil and retain the self-supporting coil onto the mandrel by friction, the mandrel configured to rotate relative to the body such that i) when the mandrel rotates relative to the body the self-supporting coil rotates relative to the body and an end portion of the cutting filament uncoils and exits from the peripheral opening, and ii) when the mandrel is stationary relative to the body the self-supporting coil is fixed relative to the body.

26. A cutting head for a vegetation cutting machine comprising:

a body configured to be driven in rotation by a motor and having an inner recess and a peripheral opening;

said inner recess for receiving a self-supporting coil, said self-supporting coil formed by a plurality of annular turns of a cutting filament around a central void, each turn being temporarily bonded to an adjacent turn, said temporary bond being of sufficient strength for said cutting filament to form said self-supporting coil and be maintained as said self-supporting coil outside said inner recess;

said peripheral opening configured to receive an uncoiled end portion of the cutting filament, a central mandrel for supporting and directly engaging said self-supporting coil, said mandrel having a peripheral surface configured to be rotationally engaged with an inner turn of the self-supporting coil, wherein the peripheral surface of the mandrel comprises serrations that are configured to engage the central void of the self-supporting coil and retain the self-supporting coil onto the mandrel by friction, the mandrel configured to selectively rotate relative to the body such that i) when the mandrel rotates relative to the body the self-supporting coil rotates relative to the body and an end portion of the cutting filament uncoils and exits from the peripheral opening, and ii) when the mandrel is stationary relative to the body the self-supporting coil is fixed relative to the body, and a supporting plate extending radially from the mandrel and connected to the mandrel, and a pressuring plate opposite to said supporting plate, wherein the pressuring plate is biased by a spring to exert a pressure onto the self-supporting coil.

* * * * *